United States Patent [19]
Lorenzo Moore et al.

[11] Patent Number: 5,741,533
[45] Date of Patent: Apr. 21, 1998

[54] METHOD OF COOKING A FOOD PRODUCT AND PRODUCT THEREOF

[75] Inventors: Tina V. Lorenzo Moore; Donald Keith Moore, Jr., both of Spartanburg, S.C.

[73] Assignee: W. R. Grace & Co.-Conn., Duncan, S.C.

[21] Appl. No.: 575,807

[22] Filed: Dec. 22, 1995

[51] Int. Cl.$^6$ .................................................. B65B 29/08
[52] U.S. Cl. .................. 426/112; 426/113; 426/127; 426/129; 426/412; 426/415; 426/105
[58] Field of Search ........................... 426/112, 113, 426/127, 129, 412, 415, 105

[56] References Cited

U.S. PATENT DOCUMENTS

| | | | |
|---|---|---|---|
| 3,674,506 | 7/1972 | Schilling et al. | |
| 3,778,515 | 12/1973 | Ashley | 426/112 |
| 3,872,196 | 3/1975 | Bridgeford | 264/37 |
| 3,894,158 | 7/1975 | Miller | 426/277 |
| 3,917,855 | 11/1975 | Burke | 426/92 |
| 3,917,862 | 11/1975 | Bridgeford | 426/274 |
| 3,943,262 | 3/1976 | Winkler et al. | 426/250 |
| 3,961,082 | 6/1976 | Winkler | 426/87 |
| 3,961,085 | 6/1976 | Winkler et al. | 426/138 |
| 4,055,672 | 10/1977 | Hirsch et al. | 426/127 |
| 4,061,786 | 12/1977 | Winkler et al. | 426/138 |
| 4,062,980 | 12/1977 | Wilson et al. | 426/278 |
| 4,064,296 | 12/1977 | Bornstein et al. | 428/35 |
| 4,081,562 | 3/1978 | Winkler | 426/390 |
| 4,356,201 | 10/1982 | Winkler | 426/138 |
| 4,442,868 | 4/1984 | Smith et al. | 426/129 |
| 4,448,792 | 5/1984 | Schirmer | 426/127 |
| 4,469,742 | 9/1984 | Oberle et al. | 426/113 |
| 4,606,922 | 8/1986 | Schirmer | 426/113 |
| 4,621,482 | 11/1986 | Crevasse | 426/129 |
| 4,769,246 | 9/1988 | Baldwin | 426/140 |
| 4,784,863 | 11/1988 | Lustig et al. | 426/113 |
| 4,794,006 | 12/1988 | Boni | 426/140 |
| 4,820,536 | 4/1989 | Lippincott et al. | 426/113 |
| 4,855,183 | 8/1989 | Oberle | 428/345 |
| 5,047,253 | 9/1991 | Juhl et al. | 426/113 |
| 5,051,266 | 9/1991 | Juhl et al. | 426/129 |
| 5,199,465 | 4/1993 | Stiem | 138/118.1 |
| 5,288,532 | 2/1994 | Juhl et al. | 428/35 |
| 5,328,705 | 7/1994 | Wilhoit et al. | 426/113 |
| 5,335,480 | 8/1994 | Zaeske et al. | 53/431 |
| 5,346,735 | 9/1994 | Logan et al. | 426/127 |
| 5,374,457 | 12/1994 | Juhl et al. | 426/129 |

FOREIGN PATENT DOCUMENTS

| | | |
|---|---|---|
| 788938 | 7/1968 | Canada. |
| 0328317 | 2/1989 | European Pat. Off.. |
| 0 400 484 A1 | 12/1990 | European Pat. Off.. |
| 6088016 | 8/1994 | European Pat. Off.. |
| 52154538 A | 6/1976 | Japan. |
| 61-3475 | 2/1986 | Japan .................. 426/112 |

*Primary Examiner*—Steven Weinstein
*Attorney, Agent, or Firm*—David G. Burleson

[57] ABSTRACT

The present invention provides a peelable laminate suitable for cook-in packaging and a method of cooking a food product. The method includes the steps of:

a) enclosing a food product in the peelable laminate, the peelable laminate having
   (1) an edible film in contact with the food product, and
   (2) a protective film peelably adhered to the edible film; and b) heating the enclosed food product to at least partially cook the food product, the edible layer adhering to the at least partially cooked food product with an adhesive strength which is greater than the force required to peel the protective film from the edible film. In this manner, the protective film can be peeled from the edible film after cooking without product loss due to adherence of food particles to the film. Furthermore, the peelable laminate prevents or minimizes cook-out and allows a modifier to be transferred to the food product via the edible film during the cooking process.

23 Claims, No Drawings

METHOD OF COOKING A FOOD PRODUCT AND PRODUCT THEREOF

BACKGROUND OF THE INVENTION

This invention relates generally to films suitable for "cook-in" packaging. More specifically, the invention relates to improved cook-in films which comprise a peelable laminate having an edible film peelably adhered to a protective film, and to methods of cooking a food product in such a peelable/cook-in laminate.

Food products are often processed, i.e., cooked, in a thermoplastic film package by, for example, immersing the package in hot water or placing the package in a steam-heated environment. This process is referred to as a "cook-in" process and the film used in the process is known as a "cook-in" film. Cook-in packaged foods are essentially foods cooked in a package. The processed and packaged food product may be refrigerated, shipped to a retailer, and stored until the processed food is to be consumed or, e.g., sliced and repackaged into smaller portions for customer display (e.g., sliced luncheon meat). Alternatively, the processed food may be immediately removed from the cook-in package and either consumed or sliced and repackaged for customer display.

Films for cook-in packaging must be structurally capable of withstanding exposure to cook-in time and temperature conditions while containing the food product. Cook-in time and temperature conditions typically involve a long, slow cook, for example, submersion in hot water at about 55° C. to 65° C. for about 1 to about 4 hours. Submersion in water or steam at 70° C. to 100° C. for up to 12 hours is also possible.

Following the cook-in process, the film package should substantially conform to the shape of the contained food product. This is preferably achieved by the film being heat-shrinkable under cook-in conditions to form a tightly-fitting package. In other words, the cook-in film desirably possesses sufficient shrink energy that submerging the packaged food product in hot water during the cook-in process will shrink the packaging film snugly around the contained product. Alternatively, the cook-in film package may be caused to shrink around the contained food product prior to initiating the cook-in procedure by e.g., placing the package in a heated environment prior to cooking.

The cook-in film should also possess sufficient product adherence to restrict or prevent "cook-out," i.e., collection of juices between the surface of the contained food product and the food-contact-surface of the packaging material during cook-in, thereby increasing product yield and providing a more aesthetically-appealing package.

It is often desirable to apply a modifier to the outer surface of the processed food product. For example, if the food product is poultry or ham, it may be desirable to impart smoke color, flavor, and odor to the outer surface of the cooked poultry or ham. This is often accomplished by applying "liquid smoke" to the outer surface of the food product during or after cooking. It would be desirable for the cook-in film to allow smoke color, flavor, and ordor to be transferred to the poultry or ham during the cook-in process.

Conventional cook-in films possess a number of undesirable drawbacks. Some films do not provide sufficient adherence to the surface of the food product to prevent cook-out. This results in reduced product yield and an unsightly package-appearance. Other cook-in films successfully prevent cook-out, but adhere to the surface of the food product with such adhesive strength that portions of the food product are torn away from the remainder of the food product when the cook-in film is peeled from the food product after cooking. That is, the cohesive force within the food product is overcome by the adhesive force between the cook-in film and the surface of the food product. As a result, product yield is reduced and the food product has an unsightly (pitted) surface-appearance.

A further drawback of many conventional cook-in films is their inability to serve as a vehicle for transferring a modifier to a food product during the cook-in process. Attempts to do so have been largely unsuccessful, often resulting in non-uniform or no transfer of the modifier. Consequentially, modifier must be applied to the food product after the cook-in process has been completed. This necessitates stripping the cook-in film from the cooked food product, applying the modifier to the surface of the food product, and then repackaging. Not only does this procedure add time, expense, and complexity to the cooking/packing process, but it increases the likelihood that the food product will become contaminated. That is, inasmuch as cooking sterilizes the food product, it is preferred that the food product not be removed from its cook-in package and handled until it is to be consumed or sliced for retail display.

Another material used for cook-in packaging is collagen. While this material is advantageous in certain respects, it is very expensive and provides no shrinkage during the cooking process. Hence, a tight, aesthically-pleasing package appearance is difficult to achieve with collagen and cook-out often occurs. In addition, collagen adheres very well to most food products, often resulting in product loss when the collagen is stripped away from the food product due to food particles product adhering to the collagen.

Accordingly, a need exists in the art for a cook-in packaging film which minimizes or prevents cook-out, can be peeled from the food product after cook-in without tearing away portions of the surface of the food product, and which facilitates the transfer of a modifier to the food product during the cook-in process.

SUMMARY OF THE INVENTION

That need is met by the present invention which provides a method of cooking a food product, comprising the steps of:
  a) enclosing a food product in a peelable laminate, the peelable laminate comprising
    (1) an edible film in contact with the food product, and
    (2) a protective film peelably adhered to the edible film; and
  b) heating the enclosed food product to at least partially cook the food product, the edible layer adhering to the at least partially cooked food product with an adhesive strength which is greater than the force required to peel the protective film from the edible film.

The method may further include the step of peeling the protective film from the edible film, in which case the food product remains enclosed within the edible film. This further step may be performed at any desired time following the cooking process, e.g, immediately after cooking or after the cooked and packaged food product has been shipped and/or stored.

The edible film may be formed from any suitable material, but preferably comprises a material selected from the group consisting of proteins, carbohydrates, organic acids, polyethers, vinyl alcohols, and blends of the foregoing materials.

In accordance with another aspect of the present invention, a method of simultaneously cooking and transferring a modifier to a food product is provided, comprising the steps of:

a) enclosing a food product in a peelable laminate, the peelable laminate comprising
   (1) an edible film in contact with the food product, the edible film including therein a modifier, and
   (2) a protective film peelably adhered to the edible film; and
b) heating the enclosed food product to transfer at least some of the modifier to the food product and at least partially cook the food product, the edible layer adhering to the at least partially cooked food product with an adhesive strength which is greater than the force required to peel the protective film from the edible film.

Examples of modifiers which can be transferred to the food product via the edible film during cooking include colorants, odorants, flavorants, antioxidants, antimicrobial agents, enzymes, odor absorbents, or blends of the foregoing materials.

In accordance with yet another aspect of the present invention, a peelable laminate is provided, comprising:
a) an edible film; and
b) a protective film peelably adhered to the edible film, the protective film comprising
   (1) a first layer in contact with the edible film and formed from a material selected from the group consisting of ethylene/vinyl acetate copolymer, ethylene/alpha-olefin copolymer, polyamide, ethylene/vinyl alcohol copolymer, polyvinyl alcohol, ionomer, an edible material, polypropylene homopolymer or copolymer (e.g., propylene/ ethylene copolymer), polystyrene homopolymer or copolymer (e.g., styrene/butadiene copolymer), ethylene/acrylic acid copolymer, ethylene/methyl acrylate copolymer, polyurethanes, and blends of the foregoing materials; and
   (2) a second layer formed from a material selected from the group consisting of ethylene/vinyl acetate copolymer, ethylene/acrylate copolymer (e.g., ethylene/methyl acrylate, ethylene/ethyl acrylate, ethylene/butyl acrylate), high density polyethylene, low density polyethylene, ethylene/alpha-olefin copolymer (e.g., linear low density polyethylene, very low density polyethylene), polyester, polypropylene homopolymer and copolymer, polystyrene, polyamide, and blends of the foregoing materials.

The foregoing methods and peelable laminates of the present invention result in minimal or no cook-out, allow the protective film to be peeled from the food product after cook-in without tearing away portions of the food product, and allow a modifier to be transferred to the food product during the cook-in process. In addition, the peelable laminates are shrinkable and are well suited to withstand cook-in time and temperature conditions.

Definitions

As used herein, the terms "polymer," "polymeric," and the like, unless specifically defined, generally include homopolymers, copolymers, terpolymers, and blends and modifications thereof.

As used herein, the phrase "edible film" refers to a monolayer or multilayer film formed from one or more materials ("edible materials") which can be consumed, and at least partially digested, by the human body without toxic effect such that the edible film can be consumed, i.e., eaten, along with a food product enclosed within the edible film. Non-limiting examples of suitable edible materials include proteins, such as casein, collagen, or whey; organic acids, such as lactic acid polymers; polyvinyl alcohol; polyethers, such as polyethylene oxide; and carbohydrates, including polysaccharides such as carrageenan, hydroxy propyl methyl cellulose, and carboxy methyl cellulose.

As used herein, the phrase "protective film" refers to any monolayer or multilayer film that is suitable for cook-in packaging and which can be peelably adhered to the edible film.

As used herein, the phrase "peelable laminate" refers to a composite structure of two or more films which are bonded together by any suitable means such as, e.g., coextrusion, lamination, extrusion coating, casting, solution casting, etc., wherein at least two of the films are peelably adhered to one another.

As used herein, the phrase "peelably adhered" refers to two films bonded together with sufficiently-low adhesive strength that the films can be separated by being peeled apart without causing significant damage to either film, i.e., both films remain substantially intact after being peeled apart.

As used herein, the term "cook" refers to any procedure whereby a food product is heated, thereby effecting a change in the physical or chemical properties (e.g., color, texture, taste, etc.) of the food product.

As used herein, the term "modifier" refers to a substance that effects a change or modification of a surface to which it is transferred, including, e.g., changes in color, odor, flavor, etc.

As used herein, the phrase "interior layer" refers to any layer of a multilayer film having both of its principal surfaces directly adhered to another layer of the film.

As used herein, the phrase "exterior layer" refers to any layer of a multilayer film having only one of its principal surfaces directly adhered to another layer of that film. In the multilayer, protective films in accordance with the present invention, there are two exterior layers, each of which has a principal surface adhered to only one other layer of the protective film. The other principal surface of each of the two exterior layers forms the two principal outer surfaces of the protective film. One of the two outer surfaces of the protective film is peelably adhered to an outer surface of the edible film. The other outer surface forms the outside surface of the cook-in package, to which no other layers or films are adhered.

As used herein, the phrase "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymer" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

DETAILED DESCRIPTION OF THE PREFERRED EMBODIMENTS

As noted above, a peelable laminate in accordance with the present invention includes an edible film and a protective film peelably adhered to the edible film. The two films may be bonded together by any suitable means which allows them to be peelably separated after the cook-in procedure is completed. Such bonding means include, without limitation, coextrusion, extrusion coating, corona bonding, solution-casting, or lamination. Suitable lamination techniques include, e.g., extrusion lamination, thermal lamination, or adhesive-based lamination.

The edible film is in contact with the packaged food product and, preferably, has a stronger adhesive affinity for the food product than for the protective film so that the protective film can be peelably removed from the edible film after cooking has been completed. The edible film may be formed from any suitable edible material as defined above, i.e., proteins, such as casein, collagen, or whey; organic acids, such as lactic acid polymers; polyvinyl alcohol; polyethers, such as polyethylene oxide; and carbohydrates, including polysaccharides such as carrageenan, hydroxy propyl methyl cellulose, and carboxy methyl cellulose. Such materials are commercially available from a number of suppliers. Specific examples of carrageenan and hydroxy propyl methyl cellulose are listed in the Examples below.

The primary function of the protective film is to protect the edible film and packaged food product from contamination and to provide abuse-resistance. The film is preferably a multilayer film having at least two layers. The first layer, an exterior layer in contact with and peelably adhered to the edible layer, may be formed from any suitable material which adheres to the edible layer with an adhesive strength which is less than the adhesive strength between the edible layer and the packaged food product. In this manner, the protective film can be peeled from the edible layer while the food product remains enclosed within the edible layer. The edible layer is thus consumed along with the food product.

This avoids the problem of tearing away portions of the food product when the protective film is removed because the protective film does not come in contact with the food product.

The primary function of the first layer of the protective film is to peelably adhere the edible film to the protective film. Preferred materials from which the first layer may be formed include, without limitation, ethylene/vinyl acetate copolymer, ethylene/alpha-olefin copolymer, polyamide, ethylene/vinyl alcohol copolymer, polyvinyl alcohol, ionomer, polypropylene homopolymer or copolymer (including propylene/ethylene copolymer and metallocene-catalyzed polypropylene homopolymer), polystyrene homopolymer or copolymer (e.g., styrene/butadiene copolymer), ethylene/acrylic acid copolymer, ethylene/methyl acrylate copolymer, polyurethanes, or blends of the foregoing materials. If desired, the first layer may also be formed from an edible material, such as those described above in connection with the edible film. Any such edible material from which the first layer is formed must, of course, be capable of peelably releasing from the edible film.

The second of the two layers from which the protective film is preferably formed serves as the second exterior layer of the protective film. Moreover, this second layer provides the outer surface of the cook-in package. In this regard, the primary function of the second layer is to provide contamination-prevention and abuse-resistance to the package both during the cook-in process and thereafter, i.e., until the protective film is peeled from the package. Preferred materials from which the second layer may be formed include, without limitation, ethylene/vinyl acetate copolymer, ethylene/acrylate copolymer (e.g., ethylene/methyl acrylate, ethylene/ethyl acrylate, ethylene/butyl acrylate), high density polyethylene, low density polyethylene, ethylene/alpha-olefin copolymer (e.g., linear low density polyethylene, very low density polyethylene), polyester, polypropylene homopolymer and copolymer (including propylene/ethylene copolymer and metallocene-catalyzed polypropylene homopolymer), polystyrene, polyamide, and blends of the foregoing materials.

If desired, additional layers may be included in the protective film. For example, it will normally be preferred that the peelable laminate be shrinkable in order to form a tight-fitting package around the food product either before or during cook-in. In this case, a shrink-control layer is preferably provided as an interior layer in the protective film. The shrink-control layer should have sufficient thickness, and the protective film should be stretch-oriented during its manufacture (i.e., biaxially stretched at a temperature between the glass transition and melt temperature of the protective film and then quickly quenched to lock in the molecular orientation) to such an extent, that the entire peelable laminate will shrink tightly around the packaged food product at the desired cook-in or pre-cook-in temperature. The shrink-control layer initiates compatible shrinkage of the entire structure. The relative thickness of the shrink-control layer is selected as being sufficient relative to that of the overall film thickness such that the shrink temperature of the shrink-control layer controls the shrinkage of the entire multi-layer film, when oriented. Preferred materials from which the shrink-control interior layer may be formed include, e.g., ethylene/vinyl acetate copolymer, ethylene/acrylate copolymer (e.g., ethylene/methyl acrylate, ethylene/ethyl acrylate, ethylene/butyl acrylate), low density polyethylene, ethylene/alpha-olefin copolymer (e.g., linear low density polyethylene, very low density polyethylene), and blends of the foregoing materials.

Alternatively, or in addition to the first interior layer, the laminate may contain a second interior layer formed from a material which provides a barrier to the transmission of oxygen, such as a material selected from the group consisting of ethylene/vinyl alcohol, vinylidene chloride copolymer, polyamide, polyvinyl alcohol, polyhydroxyaminoether, and blends of the foregoing materials.

If desired or necessary, one or more additional interior layers of the protective film may include an edible material (such as, e.g., any of those materials listed above as being suitable for the edible film), polyamide, polyurethane, or any other material which imparts desired properties to the protective film. In addition, any number of tie or adhesive layers may be included in the protective film as desired. Examples include anhydride-grafted linear low density polyethylene or anhydride-grafted ethylene/vinyl acetate copolymer.

Each of the foregoing materials from which the protective film may be constructed are commercially available from a number of suppliers. Specific examples are listed in the Examples below. The protective film may be produced by any suitable technique known in the art of film-making, such as, e.g., coextrusion, extrusion coating, or lamination. Particularly when a shrink-control interior layer is to be included in the protective film, coextrusion is preferred, followed by stretch-orienting in both the machine and transverse directions and then a rapid quench to lock in the molecular orientation. In this fashion, the protective film will be heat-shrinkable, preferably at the conditions under which the cook-in procedure is performed. If desired, either or both of the protective film and edible film may be chemically or electronically cross-linked.

In a highly preferred embodiment of the invention, the edible film contains a modifier. During the cook-in process, the edible film has been found to be capable of transferring at least some of the modifier to the packaged food product. This is highly-advantageous in that it avoids the need for extra processing steps, along with increased chances for contamination, to apply a modifier to an already-cooked food product.

In most instances, some of the modifier will remain with the edible film after the cooking process has been completed. Since the edible film remains with the cooked food product after the protective film has been removed, the edible film itself can thereby enhance the effect of the modifier.

Any desired modifier(s) can be included with the edible film. Non-limiting examples include colorants (e.g., dyes or pigments such as β-carotene), odorants, flavorants, antioxidants (to control rancidity), antimicrobial agents, enzymes, odor absorbents, or blends of the foregoing materials. Modifiers which impart more than one of the above properties may also be used. For example, "liquid smoke" is a colorant-flavorant-odorant which is used to impart a wood-smoked quality to red meat, poultry, ham, sausage, etc. Various liquid smokes, as well as the other modifiers listed above, are commercially available from a number of different suppliers.

In carrying out the methods of the present invention, a food product is first enclosed in a peelable laminate as described above, with the edible film being in contact with the food product. Any suitable means of enclosing the food product in the peelable laminate may be employed. Preferably, the peelable laminate is in the form of a bag or casing with a single opening. The food product is placed inside of the bag or casing and the opening is sealed closed, e.g., by heat-sealing, so that the resultant enclosure is substantially liquid-tight. The enclosed food product is then heated for a time and at a temperature sufficient to at least partially, but preferably fully, cook the food product. Any suitable means of heating may be employed, including immersing the enclosed food product in a bath of heated water or steam, or placing the enclosed food product in a hot air or steam cabinet.

After the desired degree of cooking has been achieved, the processed and packaged food product is removed from the heating means and allowed to cool. The edible layer adheres to the cooked food product with an adhesive strength which is greater than the force required to peel the protective film from the edible film. In this manner, the protective film can be stripped from the edible film/food product at any desired time after the cooking process has been completed. That is, the protective film may be immediately stripped and the edible film/food product may then be either consumed or further processed, e.g., sliced and repackaged into smaller portions for customer display by a retailer. Alternatively, the processed and packaged food product may be refrigerated, shipped to a retailer, and stored until the processed food is to be consumed or further processed, e.g., sliced and repackaged into smaller portions for customer display. In this instance, the protective film would preferably remain on the packaged food product until just before consumption or retail processing.

Food products which may be packaged and cooked in accordance with the present invention can be any of those foods which are amenable to cook-in packaging, including whole muscle or chopped red meat, poultry, pork, or fish; vegetables; fruits; etc.

The invention will now be described with reference to the following examples, which are intended to be illustrative only and not limiting in scope.

EXAMPLES

In each of the following examples, peelable laminates in accordance with the present invention were subjected to cook-in testing by first preparing a chicken breast meat batter having 3% salt, 0.5% phosphate, and 35% water, the balance being defatted chicken breast meat (all percentages based on the total weight of chicken breast). Sections of 4.5 inch diameter PVC pipe were stuffed with the meat batter and were capped on both sides with 6"×6" pieces of various peelable laminates in accordance with the present invention. Restraining plates were placed over the capped ends of the stuffed pipe sections and the resultant sample assemblies were subjected to a cook-in procedure wherein the sample assemblies were immersed in a hot water bath at 60° C. for thirty minutes, 65° C. for an additional thirty minutes, and then 70° C. for a final thirty minutes. The sample assemblies were then placed in an ice bath for 90 minutes. After cooling, the restraining plates were removed and the protective film was peeled from the edible film so that the performance of the peelable laminate could be ascertained. In all examples, the protective film had a thickness of approximately 1.5 mils.

The following materials, having the indicated designations, were used in the examples:

"PVOH"—Vinex™ 2144; a polyvinyl alcohol commercially available from Air Products.

"HPMC$_1$"—Methocel™ E15; a hydroxy propyl methyl cellulose commercially available from Dow Chemical. This material was obtained in powder form and was made into a solution by mixing with water at 90° C., acetic acid, and "LS" (liquid smoke, see below). The mixture was solution-cast onto various protective films and allowed to dry overnight. The resultant edible films had a thickness raging from 1.0 to 4.8 mils.

"HPMC$_2$"—EM 1100; a hydroxy propyl methyl cellulose commercially available from Watson Foods Co., West Haven, Conn., 06516. This material was obtained in film form (1.9 mils in thickness) and was heat-laminated onto the various protective films as described below.

"CAR$_1$"—a commercially available powdered carrageenan polysaccharide.

"CAR$_2$"—EC 4000; a carrageenan polysaccharide commercially available from Watson Foods Co., West Haven, Conn., 06516. This material was obtained in film form (1.9 mils in thickness) and was heat-laminated onto the various protective films as described below.

"CAS"—a powdered casein commercially available from American Casein Co., Burlington, N.J.

"EVA$_1$"—PE1345 YY; an ethylene/vinyl acetate copolymer having a vinyl acetate content of 3.6% and commercially available from Rexene.

"EVA$_2$"—Elvax™ 3165; an ethylene/vinyl acetate copolymer having a vinyl acetate content of 18% and commercially available from DuPont.

"ADH$_1$"—Plexar™ 107; anhydride-grafted polyolefin in ethylene/vinyl acetate and commercially available from Quantum.

"ADH$_2$"—Tymor™ 1203; anhydride-grafted linear low density polyethylene, commercially available from Morton International.

"HDPE$_1$"—Fortiflex J60-800C-147; a high density polyethylene from Solvay Polymers.

"HDPE$_2$"—Fortiflex J60-500C-147; a high density polyethylene from Solvay Polymers.

"LDPE"—NA345-013; low density polyethylene commercially available from Quantum.

"LS"—Charsol LFB Supreme Liquid Smoke; a colorant-odorant-flavorant commercially available from Red Arrow Products Co., Manitowoc, Wis.

"BC"—β-Apocarotenal; a carotenoid (colorant) commercially available from BASF Corporation.

Example 1

A peelable laminate in accordance with the present invention had the following structure (where "//" indicates a peelable bond between the protective film to the left of the // and the edible film to the right):

HDPE$_1$/EVA$_1$/EVA$_1$/EVA$_1$//PVOH

After cooking was completed and the sample was cooled, the protective film was peeled from the edible PVOH film, leaving the edible film intact on the cooked meat batter. No cook-out was observed and no meat particles were removed from the meat batter when the protective film was peeled from the edible film. Thus, 100% product yield was obtained.

Example 2

A peelable laminate in accordance with the present invention had the following structure (where "//" indicates a peelable bond between the protective film to the left of the // and the edible film to the right):

HDPE$_1$/EVA$_2$//PVOH

After cooking was completed and the sample was cooled, the protective film was peeled from the edible PVOH film, leaving the edible film intact on the cooked meat batter. No cook-out was observed and no meat particles were removed from the meat batter when the protective film was peeled from the edible film. Thus, 100% product yield was obtained.

Example 3

A peelable laminate in accordance with the present invention had the following structure (where "//" indicates a peelable bond between the protective film to the left of the // and the edible film to the right):

HDPE$_2$/EVA$_1$//PVOH

After cooking was completed and the sample was cooled, the protective film was peeled from the edible PVOH film, leaving the edible film intact on the cooked meat batter. No cook-out was observed and no meat particles were removed from the meat batter when the protective film was peeled from the edible film. Thus, 100% product yield was obtained.

Example 4

A peelable laminate in accordance with the present invention had the following structure (where "//" indicates a peelable bond between the protective film to the left of the // and the edible film to the right):

HDPE$_2$/EVA$_1$//HPMC$_1$+LS

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained). Further, liquid smoke was successfully transferred to the cooked meat.

Example 5

A peelable laminate in accordance with the present invention had the following structure (where "//" indicates a peelable bond between the protective film to the left of the // and the edible film to the right):

HDPE$_2$/ADH$_2$//HPMC$_1$+LS

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained). Further, liquid smoke was successfully transferred to the cooked meat.

Example 6

A peelable laminate in accordance with the present invention had the following structure (where "//" indicates a peelable bond between the protective film to the left of the // and the edible film to the right):

LDPE/EVA$_2$//HPMC$_1$+LS

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained). Further, liquid smoke was successfully transferred to the cooked meat.

Example 7

A peelable laminate in accordance with the present invention had the following structure (where "//" indicates a peelable bond between the protective film to the left of the // and the edible film to the right):

$HDPE_2/EVA_1//HPMC_1+LS$

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained). Further, liquid smoke was successfully transferred to the cooked meat.

Example 8

A peelable laminate in accordance with the present invention had the following structure (where "//" indicates a peelable bond between the protective film to the left of the // and the edible film to the right):

$HDPE_2/EVA_1//HPMC_1+LS+BC$

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained). Further, both the liquid smoke and carotenoid were successfully transferred to the cooked meat.

Example 9

A peelable laminate in accordance with the present invention had the following structure (where "//" indicates a peelable bond between the protective film to the left of the // and the edible film to the right):

$HDPE_2/ADH_1//HPMC_1+LS$

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained). Further, liquid smoke was successfully transferred to the cooked meat.

Example 10

A peelable laminate in accordance with the present invention had the following structure (where "//" indicates a peelable bond between the protective film to the left of the // and the edible film to the right):

$HDPE_2/EVA_1//HPMC_1+CAS+CAR_1+LS$

The edible film was formed by blending 10 g HPMC, 1 g CAS, and 1 g CAR with 90 ml water, 0.5 ml acetic acid, and 3 ml LS. The resultant mixture was solution-cast onto the protective film and allowed to dry before applying to the meat batter.

After cooking was completed and the sample was cooled, the protective film was peeled from the edible film, leaving the edible film intact on the cooked meat batter. No cook-out was observed and no meat particles were removed from the meat batter when the protective film was peeled from the edible film (i.e., 100% product yield was obtained). Further, liquid smoke was successfully transferred to the cooked meat.

Example 11

A peelable laminate in accordance with the present invention had the following structure (where "//" indicates a peelable bond between the protective film to the left of the // and the edible film to the right):

$HDPE_2/ADH_1//CAR_2$

After cooking was completed and the sample was cooled, the protective film was peeled from the edible carrageenan film, leaving the edible film intact on the cooked meat batter. No cook-out was observed and no meat particles were removed from the meat batter when the protective film was peeled from the edible film (i.e., 100% product yield was obtained).

Example 12

A peelable laminate in accordance with the present invention had the following structure (where "//" indicates a peelable bond between the protective film to the left of the // and the edible film to the right):

$HDPE_2/ADH_1//HPMC_2$

After cooking was completed and the sample was cooled, the protective film was peeled from the edible HPMC film, leaving the edible film intact on the cooked meat batter. No cook-out was observed and no meat particles were removed from the meat batter when the protective film was peeled from the edible film (i.e., 100% product yield was obtained).

Example 13

A peelable laminate in accordance with the present invention is made by first preparing a 100 ml aqueous salt solution with 200 mM NaCl or 11 mM $CaCl_2$ and 3 ml liquid smoke. The pH of the solution is adjusted to 7.0. A sufficient amount of whey protein isolate or concentrate is then added to the solution such that the total weight percent of protein in the solution is ten (whey protein isolate contains approximately 90% protein while whey protein concentrate contains approximately 75% protein). The solution is heated to 80° C. and then cast onto a protective film (e.g., onto the EVA side of a EVA/HDPE film). The resultant laminate is heated for 30 minutes at 90° C. to form a peelable laminate having an edible, viscoelastic solid film peelably adhered to an EVA/HDPE protective film.

While the invention has been described with reference to illustrative examples, those skilled in the art will understand that various modifications may be made to the invention as described without departing from the scope of the claims which follow.

What is claimed is:

1. A method of cooking a food product, comprising the steps of:

a) enclosing said food product in a peelable laminate to provide a packaged food product, said peelable laminate comprising (1) an edible film in contact with said food product, and
(2) a protective film providing protection to said edible film and food product against contamination and abuse, said protective film being peelably adhered to said edible film; and b) heating said packaged food product so as to at least partially cook said food product, said edible film adhering to the at least partially cooked food product with an adhesive strength greater than that required to peel said protective film from said edible film.

2. The method of claim 1 further comprising:

c) after said heating step, peeling said protective film from said edible film, said food product remaining substantially enclosed within said edible film.

3. The method of claim 1 wherein said edible film comprises a material selected from the group consisting of proteins, carbohydrates, organic acids, polyethers, vinyl alcohols, and a blend of any of the foregoing.

4. The method of claim 1 wherein said edible film comprises a food product modifier.

5. The method of claim 4 wherein said food product modifier comprises a material selected from the group consisting of colorants, odorants, flavorants, antioxidants, antimicrobial agents, enzymes, odor absorbents, and a blend of any of the foregoing.

6. The method of claim 4 wherein at least a portion of said food product modifier transfers to said food product during said heating step.

7. The method of claim 4 wherein said food product modifier is a liquid smoke.

8. The method of claim 7 wherein said food product comprises a meat.

9. The method of claim 1 wherein said heating step includes immersing the enclosed food product in a bath of heated water or steam.

10. The method of claim 9 wherein said protective film shrinks when said enclosed food product is immersed in said bath.

11. The method of claim 1 wherein said protective film comprises:

a) a first layer in contact with said edible film, said first layer being formed from a material selected from the group consisting of ethylene/vinyl acetate copolymer, ethylene/alpha-olefin copolymer, polyamide, ethylene/vinyl alcohol copolymer, polyvinyl alcohol, ionomer, an edible material, polypropylene homopolymer or copolymer, polystyrene homopolymer or copolymer, ethylene/acrylic acid copolymer,. ethylene/methyl acrylate copolymer, polyurethanes, and a blend of any of the foregoing; and b) a second layer formed from a material selected from the group consisting of ethylene/vinyl acetate copolymer, ethylene/acrylate copolymer, high density polyethylene, low density polyethylene, ethylene/alpha-olefin copolymer, polyester, polypropylene homopolymer or copolymer, polystyrene, polyamide, and a blend of any of the foregoing.

12. The method of claim 11 wherein said protective film further comprises an interior layer positioned between said first and second layers, said interior layer being formed from a material selected from the group consisting of ethylene/vinyl acetate copolymer, ethylene/acrylate copolymer, low density polyethylene, ethylene/alphaolefin copolymer, polyamide, an edible material, polyurethane, and a blend of any of the foregoing.

13. The method of claim 12 wherein said protective film further comprises a second interior layer positioned between said first and second layers, said second interior layer being formed from a material selected from the group consisting of ethylene/vinyl alcohol, vinylidene chloride copolymer, polyamide, polyvinyl alcohol, polyhydroxyaminoether, and a blend of any of the foregoing.

14. A cooked and packaged food product resulting from the method of claim 1.

15. A method of cooking and transferring a modifier to a food product, comprising the steps of:

a) enclosing a food product in a peelable laminate to form a packaged food product, said peelable laminate comprising
(1) an edible film comprising a food product modifier, said edible film contacting said food product, and
(2) a protective film providing protection to said edible film and food product against contamination and abuse, said protective film being peelably adhered to said edible film; and b) heating said packaged food product so as to at least partially cook said food product, said edible film adhering to the at least partially cooked food product with an adhesive strength greater than that required to peel said protective film from said edible film.

16. The method of claim 15 further comprising the step of:

c) after said heating step, peeling said protective film from said edible film, said food product remaining substantially enclosed within said edible film.

17. The method of claim 15 wherein said edible film comprises a material selected from the group consisting of proteins, carbohydrates, organic acids. polyethers, vinyl alcohols, and a blend of any of the foregoing.

18. The method of claim 15 wherein said food product modifier comprises a material selected from the group consisting of colorants, odorants, flavorants, antioxidants, antimicrobial agents, enzymes, odor absorbents, and a blend of any of the foregoing.

19. The method of claim 15 wherein said heating step includes immersing said packaged food product in a bath of heated water or steam.

20. The method of claim 19 wherein said protective film shrinks when said packaged food product is immersed in said bath.

21. A cooked and packaged food product resulting from the method of claim 15.

22. The method of claim 15 wherein said food product modifier is a liquid smoke.

23. The method of claim 22 wherein said food product comprises a meat.

* * * * *